(12) United States Patent
Li et al.

(10) Patent No.: US 12,623,262 B2
(45) Date of Patent: May 12, 2026

(54) GEOGRID PREPARED BY RECYCLING MEDICAL WASTE AND PREPARATION METHOD THEREFOR, AND USE IN FOUNDATION REINFORCEMENT

(71) Applicant: SHANDONG JIAOTONG UNIVERSITY, Jinan (CN)

(72) Inventors: Jin Li, Jinan (CN); Enzhou Di, Jinan (CN); Miaozhang Yu, Jinan (CN); Shen Zuo, Jinan (CN); Peng Jiang, Jinan (CN); Xinzhuang Cui, Jinan (CN)

(73) Assignee: SHANDONG JIAOTONG UNIVERSITY, Jinan (CN)

( * ) Notice: Subject to any disclaimer, the term of this patent is extended or adjusted under 35 U.S.C. 154(b) by 823 days.

(21) Appl. No.: 17/916,946

(22) PCT Filed: Jan. 4, 2021

(86) PCT No.: PCT/CN2021/070155
§ 371 (c)(1),
(2) Date: Oct. 4, 2022

(87) PCT Pub. No.: WO2021/203781
PCT Pub. Date: Oct. 14, 2021

(65) Prior Publication Data
US 2023/0149988 A1 May 18, 2023

(30) Foreign Application Priority Data

Apr. 10, 2020 (CN) .......................... 202010281198.0

(51) Int. Cl.
*B09B 3/35* (2022.01)
*B09B 3/40* (2022.01)
*B09B 101/65* (2022.01)
*B09B 101/75* (2022.01)

(52) U.S. Cl.
CPC .................. *B09B 3/35* (2022.01); *B09B 3/40* (2022.01); *B09B 2101/65* (2022.01); *B09B 2101/75* (2022.01)

(58) Field of Classification Search
CPC ..................................... B09B 3/35; B09B 3/40

USPC .......................................................... 523/351
See application file for complete search history.

(56) References Cited

U.S. PATENT DOCUMENTS 6,846,131 B2 * 1/2005 Ianniello ............. C04B 18/0445
405/129.3
2010/0080659 A1 4/2010 Halahmi et al.

FOREIGN PATENT DOCUMENTS

| CN | 104818703 A | 8/2015 |
|---|---|---|
| CN | 104818704 A | 8/2015 |
| CN | 104895040 A | 9/2015 |
| CN | 105400159 A | 3/2016 |
| CN | 105694228 A | 6/2016 |
| CN | 111363241 A | 7/2020 |

OTHER PUBLICATIONS

Wang, Yongyao, "Progress on Recovery and Utilization of Polyethylene and Polypropylene Plastics Waste," Petrochemical Technology, 2003, vol. 32, No. 8, pp. 718-723.
Mar. 2, 2021 International Search Report issued in International Patent Application No. PCT/CN2021/070155.
Mar. 2, 2021 Written Opinion of the International Searching Authority issued in International Patent Application No. PCT/CN2021/070155.

* cited by examiner

*Primary Examiner* — Deve V Hall
(74) *Attorney, Agent, or Firm* — Oliff PLC

(57) ABSTRACT

A geogrid prepared by recycling medical waste and a preparation method therefor, and use in foundation reinforcement. The method includes: recycling medical waste for treatment and processing the medical waste into a crushed material; adding modified filler and processing aids, and selecting high-strength fiber bundles for compounding and melting with the crushed material and pressing and stretching to prepare a geogrid. The medical waste is any combination of one or more used medical plastic products and medical plastic products that expire and are not used. The high-strength fiber bundles are more than one bundle of fiber materials commonly used for manufacturing geogrids on the market. The modified filler is a stabilizer for improving the stability of component materials to heat and light. The processing aids are enhancers for improving the performance of the component materials.

16 Claims, No Drawings

GEOGRID PREPARED BY RECYCLING MEDICAL WASTE AND PREPARATION METHOD THEREFOR, AND USE IN FOUNDATION REINFORCEMENT

TECHNICAL FIELD

The present invention relates to the field of civil engineering, and in particular, to a geogrid prepared by recycling medical waste and a preparation method therefor, and use in foundation reinforcement.

BACKGROUND

Information of the Related Art part is merely disclosed to increase the understanding of the overall background of the present invention, but is not necessarily regarded as acknowledging or suggesting, in any form, that the information constitutes the prior art known to a person of ordinary skill in the art.

With the significant development of health care and the increasing number of visits, social medical and health institutions generate a large amount of medical waste every day. Especially when a large-scale epidemic occurs, the severe problem of medical waste disposal needs to be resolved urgently and properly. Medical waste is an important risk factor that causes disease transmission or related public health problems, which has attracted widespread attention.

The existing medical waste disposal technologies are mainly incineration, and some medical waste is landfilled after high-temperature steam sterilization and dry chemical sterilization. Failure to meet the disposal technical standards in each step has bad impact on environmental protection. Currently, there are relatively few units that have obtained relevant qualifications, and the disposal capability is limited. Many medical institutions generate a large amount of medical waste every day, and the medical waste is distributed in an extremely scattered way. Disposal units have a long way to collect the medical waste, which is time-consuming and has high costs and many hidden dangers. Much medical waste may not be disposed of in time, causing huge hidden dangers to the health life of the public.

Several countries promote centralized harmless disposal of medical waste and encourage the research and development of relevant technologies of safe disposal of medical waste. At present, research has found that polymer materials in plastic products of some recycled medical waste can be used in the manufacture of geogrids after sterilization and reprocessing. However, the inventor found that current geogrids manufactured by medical waste plastics still need to be improved in terms of product performance and manufacturing costs.

SUMMARY

The present invention is to resolve the problem of difficulty in disposing medical waste, recycle some medical waste through sterilization treatment and reprocessing, and provide a method for preparing a geogrid by recycling medical waste.

To achieve the foregoing technical objective, the present invention adopts the following technical solutions:

A first aspect of the present invention provides a geogrid prepared by recycling medical waste, prepared from the following raw materials: 70 to 90 parts of medical plastic waste, 3.5 to 5 parts of modified filler, 6.5 to 15 parts of processing aids, and 1 to 2 bundles of high-strength fiber bundles.

Through the method in this application, the product performance of geosynthetics is improved, and manufacturing costs are reduced, so that the geogrid prepared by recycling medical waste has many competitive advantages on the market.

Compared with the existing method of "reinforcing waste plastics with high-strength fiber materials", in this application, modified filler such as silicon carbide whiskers or kaolin is added to improve the photothermal stability of a product when master batches are prepared through melting in a particular proportion, and a processing aid such as modified carbon black, paraffin, or calcium stearate is added to improve the aging resistance and oxidation resistance of the product, and the problem of corrosion by acid, alkali, and salt can be resolved, thereby improving the elongation and tensile strength of a material.

A second aspect of the present invention provides a method for preparing a geogrid by recycling medical waste, including:

sterilizing and crushing medical waste to form a medical waste crushed material;

mixing the medical waste crushed material with a particular proportion of modified filler and processing aids and performing melt granulation to form master batches; and melting and compounding the master batches with high-strength fiber bundles, and rolling into a plate, punching, and stretching to obtain a geogrid.

A third aspect of the present invention provides use of the foregoing geogrid prepared by recycling medical waste for reinforcement of dikes and subgrades, slope protection, cave wall reinforcement, and reinforcement of permanently loaded foundations for large airports, parking lots, and dock yards.

The present invention has the following beneficial effects:

(1) The present invention adopts the foregoing technical solutions of preparing a geogrid, to recycle medical plastic waste to prepare a base material, and select and add different fiber materials according to different commercial purposes to prepare a reinforcement material. The present invention creatively resolves the problem of disposal of some medical waste, and actively responds to relevant policies on "promoting centralized harmless disposal of medical waste and encouraging the research and development of relevant technologies of safe disposal of medical waste". The preparation of the geogrid by adopting the technical solutions has a simple process, low costs, excellent comprehensive performance, and relatively strong market competitiveness, and creates more economic and social benefits while reducing waste pollution and protecting the environment.

(2) The operation method of this application is simple and low in costs and has universality, and large-scale production is easily achieved.

DETAILED DESCRIPTION

It should be noted that, the following detailed descriptions are all exemplary and are intended to provide a further understanding to this application. Unless otherwise indicated, all technical terms and scientific terms used in this application have the same meaning as commonly understood by a person of ordinary skill in the technical field to which this application belongs.

It should be noted that the terms used herein are merely for describing specific implementations, and are not intended to limit exemplary implementations according to this application. As used herein, the singular form is also intended to include the plural form unless the context clearly dictates otherwise. In addition, it should further be understood that, terms "comprise" and/or "include" used in this specification indicate that there are features, steps, operations, devices, components, and/or combinations thereof.

A method for preparing a geogrid by recycling medical waste is provided, including: recycling some medical waste for treatment and then processing the medical waste into a crushed material; next, adding modified filler and processing aids, and selecting high-strength fiber bundles for compounding and melting with the crushed material and pressing and then stretching to prepare a geogrid. The some medical waste is any combination of one or more used medical plastic products and medical plastic products that expire and are not used. The high-strength fiber bundles are more than one bundle of fiber materials commonly used for manufacturing geogrids on the market. The modified filler is a stabilizer for improving the stability of component materials to heat and light. The processing aids are enhancers for improving the performance of the component materials.

In some embodiments, the some medical waste is used medical plastic products containing polypropylene (PP), polyethylene (PE), polyvinyl chloride (PVC), high-density polyethylene (HDPE), or polyolefin thermoplastic elastomer (TPE) and medical plastic products that expire and are not used, which serves as a base material of the geogrid.

In some embodiments, the high-strength fiber bundles are more than one bundle of fiber materials such as carbon fibers, glass fibers, steel-plastic fibers, polyester fibers, or PBO fibers commonly used for manufacturing geogrids on the market, which serve as a reinforcement material of the geogrid.

In some embodiments, the modified filler is a combination of one or more of calcium carbonate or calcium sulfate, sodium polyacrylate thickeners, zinc oxide whiskers or silicon carbide whiskers, short carbon fibers, silica, kaolin or montmorillonite, or talcum powder or mica powder. Adding a particular proportion of silicon carbide whiskers and short carbon fibers not only improves the high-temperature resistance of the materials, but also greatly improves the wear resistance and corrosion resistance of the materials, thereby prolonging the service life of the materials. Adding a particular proportion of kaolin, silica, and sodium polyacrylate thickeners can improve the high-temperature resistance and ductility of the materials. After a particular amount of short carbon fibers, calcium carbonate, and mica powder are mixed and melted with reinforcement, the toughness and aging resistance of an obtained material are significantly improved while the high-temperature resistance and corrosion resistance of the material are improved, and the service life of the material is prolonged. The modified filler (a combination of modified filler) improves the photothermal stability and aging resistance of a product.

In some embodiments, the processing aid is a combination of one or more of modified carbon black, paraffin, stearic acid, barium stearate or calcium stearate, or di (2-ethylhexyl) phthalate (commercial name: DOP). Adding a particular amount of modified carbon black, paraffin, and di (2-ethylhexyl) phthalate in proportion greatly improves the flexibility and aging resistance of the materials. Adding a proper amount of stearic acid and calcium stearate in proportion greatly improves the thermal stability of the materials and eliminates the impact on the stability of the materials after polyvinyl chloride reinforcement is melted. The processing aids (a combination of the processing aids)

improve the strength of the product and make the product resistant to aging and oxidation and resistant to corrosion in harsh environments such as acid, alkali, and salt.

In some embodiments, the method includes the following several steps:

1) sterilizing medical waste and then processing the medical waste into a crushed material;
2) melting a mixture of a corresponding proportion calculated according to weight parts, to prepare master batches;
3) melting and compounding the master batches with high-strength fiber bundles;
4) rolling into a plate for molding;
5) punching to prepare a perforated plate; and
6) stretching to prepare a finished product.

In the geogrid prepared by recycling medical waste, different high-strength fiber materials (such as carbon fibers, glass fibers, polyester fibers, steel-plastic fibers, or PBO fibers) are selected as a reinforcement material according to different purposes, some medical plastic waste, fillers, and additives are used as a base material and melted and extruded by using an extruder to prepare a wrapper; continuous high-strength fiber bundles wrapped by the wrapper are calendered to prepare grid ribs, and the grid ribs are then processed, arranged alternately, and connected to form different grid structures.

The geogrid is obtained by processing the following base component raw materials calculated according to weight parts:

70 to 90 parts of medical plastic waste, 3.5 to 5 parts of modified filler, and 6.5 to 15 parts of processing aids.

In some embodiments, the some medical plastic waste is any combination of one or more used medical plastic products containing polypropylene (PP), polyethylene (PE), polyvinyl chloride (PVC), high-density polyethylene (HDPE), or polyolefin thermoplastic elastomer (TPE) and medical plastic products that expire and are not used.

In some embodiments, the high-strength fiber bundles are more than one bundle of fiber materials such as carbon fibers, glass fibers, steel-plastic fibers, polyester fibers, or PBO fibers commonly used for manufacturing geogrids on the market.

In some embodiments, the modified filler is a combination of one or more of calcium carbonate or calcium sulfate, sodium polyacrylate thickeners, zinc oxide whiskers or silicon carbide whiskers, short carbon fibers, silica, kaolin or montmorillonite, or talcum powder or mica powder. Preferably, the processing aid is a combination of one or more of modified carbon black, paraffin, stearic acid, barium stearate or calcium stearate, or di (2-ethylhexyl) phthalate (commercial name: DOP).

The method for preparing a geogrid by recycling medical waste includes the following several steps:

1) reprocessing medical waste; 2) preparing master batches; 3) melting and compounding the master batches with high-strength fiber bundles; 4) rolling into a plate for molding; 5) punching; and 6) stretching.

The reprocessing medical waste in step 1) is to sterilize recycled medical plastic waste and then process the recycled medical plastic waste to obtain a medical plastic waste crushed material.

The preparing master batches in step 2) is to fully mix 75 to 90 parts of the medical plastic waste crushed materials, 3.5 to 5 parts of modified filler, and 6.5 to 9 parts of processing aids calculated according to weight parts, to obtain a uniform mixture, and then melt and extrude the mixture at 160° C. to 200° C. by using a parallel twin-screw extruder, to prepare the master batches.

In some embodiments, calculated according to weight parts, the modified filler is obtained by fully mixing 10 parts of calcium carbonate, 35 parts of sodium polyacrylate, 10 parts of silicon carbide whiskers, 15 parts of kaolin, and 25 parts of talcum powder after separate uniform grinding.

In some embodiments, calculated according to weight parts, the processing aid is obtained by fully mixing 25 parts of modified carbon black, 15 parts of paraffin, 10 parts of calcium stearate, and 50 parts of DOP after separate uniform grinding.

The melting and compounding the master batches with high-strength fiber bundles in step 3) is to melt compound the master batches prepared in step 2) with a particular amount of high-strength fibers by using an extruder die head, and then perform composite gum dipping for wrapping.

The rolling into a plate for molding in step 4) is to roll a composite melt prepared in step 3) into a plate by using a three-roller press.

The punching in step 5) is to punch the plate prepared in step 4) to obtain a perforated plate by using a punching machine.

The stretching in step 6) is to heat the perforated plate prepared in step 5) to 80° C. to 100° C. and then stretch the perforated plate to obtain the finished product.

The present invention is further described in detail below with reference to specific embodiments. It should be noted that the specific embodiments are intended to describe rather than limit the present invention.

Sources of raw materials in the following embodiments are as follows:

Embodiment 1: PBO Fiber Mine Geogrids

Mine geogrids are also referred to as underground plastic net artificial roofs in mine production operations, or artificial roof nets for short. Mine geogrids are commonly used as support for artificial roof support in an underground stope face, and can also be used as support materials in earth-rock anchoring and reinforcement in other mine roadway engineering, slope protection engineering, underground civil engineering, and traffic road engineering. Due to the special working environment, mining geogrids are required to be lightweight, high-strength, antistatic, non-corrosive, and flame-retardant. PBO fiber products have the highest strength among the existing chemical fiber products, with the heat-resistant temperature reaching 600° C. and the limiting oxygen index being 68. PBO fiber products do not burn or shrink in the flame, and the heat resistance and flame resistance of PBO fiber products are higher than those of any other organic fiber product.

Melt granulation is performed, by using a twin-screw extruder, on 85 parts of polypropylene (PP) medical plastic waste crushed materials (disposable blood transfusion bags are used), 4 parts of modified filler (1 part of sodium polyacrylate thickener, 2 parts of kaolin, and 1 part of zinc oxide whiskers), and 11 parts of processing aids (7 parts of calcium stearate, and 4 parts of stearic acid) calculated according to weight parts. Next, master batches are melted and compounded with 4 bundles of 100 PBO fibers (p-phenylene benzobisthiazole fibers) of 200D by using an extruder die head, and a composite melt is wrapped through composite gum dipping, and prepared into a geogrid rib through pulling and biaxial stretching by using a cooling device. The geogrid rib is welded into a geogrid after cut.

The prepared PBO fiber geogrid is not easy to generate static electricity during friction, light in weight, and convenient for underground transportation, carrying and construction. The prepared PBO fiber geogrid has a fracture elongation rate of 4.5% and a tensile strength of 600 MPa, and has a strong load-bearing capability, which can effectively prevent the falling of broken coals and protect the safety of workers underground and the safe operation of mine cars. The flame resistance is good and can reach the coal industry standards MT141-2005 and MT113-1995.

Embodiment 2: Carbon Fiber Subgrade Geogrids

Carbon fibers are a new material with excellent mechanical properties. The specific gravity of carbon fibers is less than ¼ of that of steel. The tensile strength of carbon fiber resin composite materials is more than 3500 Mpa, which is 7 to 9 times that of steel, and the tensile elastic modulus is higher than that of steel and is 230 to 430 Gpa. Carbon fibers have high strength and low creep, and are adapt to various environmental soils and suitable for reinforcement of various dikes and subgrades, slope protection, and cave wall reinforcement, and reinforcement of permanently loaded foundations for large airports, parking lots, and dock yards, or are used in tall retaining walls of high-grade highways.

Melt granulation is performed, by using a twin-screw extruder, on 90 parts of high-density polyethylene (HDPE) medical plastic waste crushed materials (medical dialyzing papers are used), 3 parts of modified filler (1 part of silicon carbide whiskers and 2 parts of short carbon fibers), and 7 parts of processing aids (5 parts of modified carbon black and 2 parts of calcium stearate) calculated according to weight parts. Next, master batches are melted and compounded with 2 bundles of 100 carbon fibers of 10D by using an extruder die head, and a composite melt is wrapped through composite gum dipping, and prepared into a geogrid rib through pulling and biaxial stretching by using a cooling device. The geogrid rib is welded into a geogrid after cut.

A prepared carbon fiber subgrade geogrid has better corrosion resistance, aging resistance, and creep resistance, is suitable for long-term use in permanent projects, and has a tensile strength of 110 MPa and a fracture elongation rate of 5%, which can effectively enhance the interlocking and engagement functions of a reinforced bearing surface, greatly enhance the bearing capability of the foundation, effectively restrain the lateral displacement of the soil, and enhance the stability of the foundation.

Embodiment 3: Glass Fiber Deep-Sea Operation Grids

Glass fibers are prepared through a series of processes by using waste glass as raw materials. Each fiber bundle includes hundreds or even thousands of monofilaments. Glass fibers have extremely stable physical and chemical properties, high strength, high modulus, high wear resistance, excellent cold resistance, and good thermal stability, have no long-term creep, and are an inorganic non-metallic material with excellent performance. Adding glass fibers during preparation of a geogrid can greatly improve the wear resistance of the geogrid, and the geogrid is easy to cut and has the advantages of good insulation performance, strong heat resistance, good corrosion resistance, and high mechanical strength.

Melt granulation is performed, by using a twin-screw extruder, on 80 parts of polyethylene (PE) medical plastic waste crushed materials (disposable infusion sets are used), 5 parts of modified filler (4 parts of sodium polyacrylate thickener and 1 part of silicon carbide whiskers), and 15 parts of processing aids (10 parts of modified carbon black, 3 parts of paraffin, and 2 parts of di (2-ethylhexyl) phthalate) calculated according to weight parts. Next, master batches are melted and compounded with glass fibers by using an extruder die head, and a composite melt is wrapped through composite gum dipping, and prepared into a geogrid rib through pulling and uniaxial stretching by using a cooling device. The geogrid rib is welded into a geogrid after cut.

A prepared glass fiber deep-sea operation grid has a tensile strength of 100 MPa and a fracture elongation rate of 3%. The prepared glass fiber deep-sea operation grid is suitable for various environmental soils with strong bearing capability, corrosion resistance, and aging resistance as well as long service life, thereby effectively avoiding construction damage caused by crushing damage by machines and tools during a construction process. Fiber glass geogrids can resist all kinds of physical wear and chemical corrosion as well as bioerosion and climate change to ensure that the performance of the fiber glass geogrids is not affected. Therefore, fiber glass geogrids are more suitable for deep-sea operations and embankment reinforcement, which fundamentally resolves the technical problems such as low strength, poor corrosion resistance, and short service life, caused by long-term erosion of seawater, of stone cages prepared from other materials.

Embodiment 4: Warp-Knitted Polyester Fiber Geogrids

High-strength polyester fibers are selected as raw materials of warp-knitted polyester fiber geogrids. Warp-knitted polyester fiber geogrids have high tensile strength, small extension force, high tearing resistance, small aspect intensity difference, UV aging resistance, wear resistance, corrosion resistance, light weight, and strong interlocking force with soil or gravel, and have significant effect on enhancing soil shear resistance and reinforcement and improving the integrity and load capability of the soil.

Melt granulation is performed, by using a twin-screw extruder, on 85 parts of polyolefin thermoplastic elastomer (TPE) medical plastic waste crushed materials (disposable sterile infusion sets are used), 4 parts of modified filler (1 part of calcium carbonate, 1 part of mica powder, and 2 parts of short carbon fibers), and 11 parts of processing aids (6 parts of modified carbon black, 3 parts of calcium stearate, and 2 parts of paraffin) calculated according to weight parts. Next, master batches are melted and compounded with high-density polyester fibers by using an extruder die head, and a composite melt is wrapped through composite gum dipping and is pulled, stretched, and cooled. An oriented warp-knitted structure is adopted, warp and weft yarns in fabrics are not bent with each other, and intersections are bound with high-strength fiber filaments to form firm bonding points to prepare a geogrid.

Prepared warp-knitted polyester fiber geogrids have various features such as extremely high tensile strength, low elongation, corrosion resistance, aging resistance, strong occlusal force with a base material, light weight, and an effect of drainage, with a tensile strength of 95 MPa and a fracture elongation rate of 3.5%. Warp-knitted polyester fiber geogrids are not only used for reinforcement of soft subgrade of various high-grade roads and railways, embankment slope reinforcement, and retaining wall reinforcement to enhance the overall strength, but also used for reinforcement, isolation, and soft soil foundation reinforcement of dikes and river channels in hydraulic engineering, as well as enhancing the protective capability of dikes and river channels and improving the bearing capability and stability of the foundation.

It should be finally noted that the foregoing descriptions are merely preferred embodiments of the present invention, but are not intended to limit the present invention. Although the present invention has been described in detail with reference to the foregoing embodiments, for a person of ordinary skill in the art, modifications can be made to the technical solutions described in the foregoing embodiments, or equivalent replacements can be made to some technical features in the technical solutions. Any modification, equivalent replacement, or improvement made within the spirit and principle of the present invention shall fall within the protection scope of the present invention. The specific implementations of the present invention are described above, but are not intended to limit the protection scope of the present invention. A person skilled in the art should understand that various modifications or deformations may be made without creative efforts based on the technical solutions of the present invention, and such modifications or deformations shall fall within the protection scope of the present invention.

What is claimed is:

1. A geogrid prepared by recycling medical waste, prepared from the following raw materials: 70 to 90 parts by weight of medical plastic waste, 3.5 to 5 parts by weight of modified filler, 6.5 to 15 parts by weight of processing aids, and 1 to 2 bundles of high-strength fiber bundles.

2. The geogrid prepared by recycling medical waste according to claim 1, prepared from the following raw materials: 70 to 80 parts by weight of medical plastic waste, 3.5 to 4 parts by weight of modified filler, 6.5 to 10 parts by weight of processing aids, and 1 to 2 bundles of high-strength fiber bundles.

3. The geogrid prepared by recycling medical waste according to claim 1, prepared from the following raw materials: 80 to 90 parts by weight of medical plastic waste, 4 to 5 parts by weight of modified filler, 10 to 15 parts by weight of processing aids, and 1 to 2 bundles of high-strength fiber bundles.

4. The geogrid prepared by recycling medical waste according to claim 1, wherein the medical plastic waste is used medical plastic products prepared from raw materials of polypropylene (PP), polyethylene (PE), polyvinyl chloride (PVC), high-density polyethylene (HDPE), or polyolefin thermoplastic elastomer (TPE) and medical plastic products that expire and are not used.

5. The geogrid prepared by recycling medical waste according to claim 1, wherein the high-strength fiber bundle is at least one of carbon fibers, glass fibers, steel-plastic fibers, polyester fibers, or PBO fibers.

6. The geogrid prepared by recycling medical waste according to claim 1, wherein the modified filler is a combination of one or more of calcium carbonate or calcium sulfate, sodium polyacrylate thickeners, zinc oxide whiskers or silicon carbide whiskers, short carbon fibers, silica, kaolin or montmorillonite, or talcum powder or mica powder.

7. The geogrid prepared by recycling medical waste according to claim 1, wherein the processing aid is a combination of one or more of modified carbon black, paraffin, stearic acid, barium stearate, calcium stearate, or di (2-ethylhexyl) phthalate.

8. A method for preparing the geogrid according to claim 1 by recycling medical waste, the method comprising:

sterilizing and crushing medical waste to form a medical waste crushed material;

mixing the medical waste crushed material with modified filler and processing aids and performing melt granulation to form master batches; and melting and compounding the master batches with high-strength fiber bundles, and rolling into a plate, punching, and stretching to obtain a geogrid.

9. The method for preparing a geogrid by recycling medical waste according to claim 8, wherein a melting temperature is 160° C. to 200° C.

10. The method of applying geogrid prepared by recycling medical waste according to claim 1 to reinforce dikes and subgrades, slope protection, cave wall reinforcement, and reinforcement of permanently loaded foundations for large airports, parking lots, and dock yards.

11. The method of applying geogrid prepared by recycling medical waste according to claim 2 to reinforce dikes and subgrades, slope protection, cave wall reinforcement, and reinforcement of permanently loaded foundations for large airports, parking lots, and dock yards.

12. The method of applying geogrid prepared by recycling medical waste according to claim 3 to reinforce dikes and subgrades, slope protection, cave wall reinforcement, and reinforcement of permanently loaded foundations for large airports, parking lots, and dock yards.

13. The method of applying geogrid prepared by recycling medical waste according to claim 4 to reinforce dikes and subgrades, slope protection, cave wall reinforcement, and reinforcement of permanently loaded foundations for large airports, parking lots, and dock yards.

14. The method of applying geogrid prepared by recycling medical waste according to claim 5 to reinforce dikes and subgrades, slope protection, cave wall reinforcement, and reinforcement of permanently loaded foundations for large airports, parking lots, and dock yards.

15. The method of applying geogrid prepared by recycling medical waste according to claim 6 to reinforce dikes and subgrades, slope protection, cave wall reinforcement, and reinforcement of permanently loaded foundations for large airports, parking lots, and dock yards.

16. The method of applying geogrid prepared by recycling medical waste according to claim 7 to reinforce dikes and subgrades, slope protection, cave wall reinforcement, and reinforcement of permanently loaded foundations for large airports, parking lots, and dock yards.

* * * * *